United States Patent [19]

Tanahashi et al.

[11] Patent Number: 4,781,154
[45] Date of Patent: Nov. 1, 1988

[54] TWO-CYCLE INTERNAL COMBUSTION ENGINE

[75] Inventors: Toshio Tanahashi, Susono; Norihiko Nakamura; Michiaki Ujihashi, both of Mishima; Hiroshi Noguchi, Gotenba; Toshio Ito, Susono; Toyokazu Baika, Susono; Katsuhiko Hirose, Susono; Kingo Horii, Susono, all of Japan

[73] Assignee: Toyota Jidosha Kabushiki Kaisha, Aichi, Japan

[21] Appl. No.: 56,687

[22] Filed: Jun. 2, 1987

[30] Foreign Application Priority Data

Jul. 2, 1986 [JP] Japan .................................. 61-154228

[51] Int. Cl.⁴ ............................................ F02B 75/02
[52] U.S. Cl. ................................ 123/65 VD; 123/302; 123/314
[58] Field of Search ............... 123/90.16, 90.17, 65 R, 123/65 PE, 65 BA, 65 E, 65 VD, 65 P, 308, 432, 302, 568, 90.15; 60/313, 314

[56] References Cited

U.S. PATENT DOCUMENTS

| 2,958,315 | 11/1960 | Williams | 123/65 VC |
|---|---|---|---|
| 3,808,807 | 5/1974 | Lanpheer | 60/313 |
| 4,224,905 | 9/1980 | von Seggern et al. | 123/65 VC |
| 4,318,373 | 3/1982 | Soubis | 123/568 |
| 4,327,676 | 5/1982 | McIntire et al. | 123/90.16 |
| 4,333,428 | 6/1982 | Tanaka et al. | 123/568 |
| 4,357,917 | 11/1982 | Aoyama | 123/90.16 |
| 4,523,560 | 6/1985 | Motosugi et al. | 123/308 |
| 4,543,928 | 10/1985 | von Seggern . | |
| 4,580,533 | 4/1986 | Oda et al. | 123/90.16 |
| 4,616,605 | 10/1986 | Kline | 123/65 VD |
| 4,682,576 | 7/1987 | Nakamura et al. | 123/52 MF |

FOREIGN PATENT DOCUMENTS

| 48-51126 | 7/1973 | Japan . | |
|---|---|---|---|
| 0068520 | 4/1984 | Japan | 181/240 |
| 59-22250 | 7/1984 | Japan . | |
| 60-5770 | 2/1985 | Japan . | |
| 0164608 | 8/1985 | Japan | 123/90.16 |
| 0247006 | 12/1985 | Japan | 60/323 |

*Primary Examiner*—Charles J. Myhre
*Assistant Examiner*—David A. Okonsky
*Attorney, Agent, or Firm*—Parkhurst, Oliff & Berridge

[57] ABSTRACT

A two-cycle internal combustion engine having three, or a multiple of three, cylinders comprises a cylinder head having an intake port and exhaust port opened to a combustion chamber, to which fresh air compressed by a supercharger is introduced via an intake valve. The intake and exhaust valves are operated in response to a crank angle. A one-way valve is provided in the intake port so as to prevent air or gas from flowing back toward the supercharger. The exhaust valve is opened earlier than the intake valve when the speed of the downward movement of the piston is relatively high, so that a part of exhaust gas in the exhaust port flows back to the combustion chamber in the condition. In a heavy load condtion, cross scavenging and air charging effects due to exhaust pulsation can be achieved.

4 Claims, 6 Drawing Sheets

TWO-CYCLE INTERNAL COMBUSTION ENGINE

BACKGROUND OF THE INVENTION

1. Field of the Invention

This invention relates to a two-cycle internal combustion engine and more particularly to a two-cycle engine having three, or a multiple of three, cylinders and, in each cylinder, intake and exhaust valves operated in response to a crank angle.

2. Description of the Related Art

Japanese Unexamined Patent Publication No. 48-51126 discloses a two-cycle engine having a sub chamber for forming a rich mixture in a scavenging passage between a cylinder chamber and a crank chamber. A one-way (reed) valve is provided in the scavenging passage between the sub chamber and the crank chamber. However, this known two-cycle engine does not have multiple cylinders and does not intend to prevent the air/gas from flowing from the exhaust system back to the intake system, which may happen particularly in a two-cycle three cylinder engine provided with air charging effects, due to exhaust pulsation among the cylinders. Therefore, this two-cycle engine does not provide an individual one-way valve for each cylinder.

A six-cylinder two-cycle engine is already known in which the exhaust systems in the respective cylinders are divided into two groups, each group including the exhaust systems of three cylinders in which the piston strokes are conducted at each phase of 120° C., to ensure that a high output power is obtained by the air charging effects due to exhaust pulsation among the cylinders, which effects are particularly distinctive in a three-cylinder two-cycle engine.

In a known four-cycle engine, such as disclosed, for example, in Japanese Examined U.M. Publication No. 59-22250, a reed valve is provided in an intake port to prevent fresh air in a cylinder chamber from flowing back to the intake port. However, this known engine pertains to a four-cycle engine and, therefore, air charging effects due to exhaust pulsation, as mentioned above, cannot be expected and the valve timings of the intake and exhaust valves are quite different from those of a two-cycle engine.

SUMMARY OF THE INVENTION

An object of the present invention is to provide a two-cycle internal combustion engine having three, or a multiple of three, cylinders and intake and exhaust valves operated in response to a crank angle, capable of preventing a flow back of air/gas from the exhaust system to the intake system, which may be caused by the charging effects due to exhaust pulsation among the cylinders.

Another object of the present invention is to provide a two-cycle engine having three, or a multiple of three, cylinders, and intake and exhaust valves operated in response to a crank angle, capable of giving an improved output power in a heavy load condition.

According to the present invention, there is provided a two-cycle internal combustion engine having three, or a multiple of three, cylinders comprises: a cylinder head having, for each cylinder, at least one intake port for introducing fresh air into a combustion chamber and at least one exhaust port for discharging exhaust gas; an air charging means for supplying compressed fresh air to the intake port; intake and exhaust valves for opening and closing the intake and exhaust ports, respectively; and a valve operating means operated in response to a crank angle; characterized in that the engine further comprises: a one-way valve provided between the intake valve and the air charging means, in the intake port in each cylinder, so that air or gas is prevented from flowing back toward the air charging means; the valve operating means including a means for opening the exhaust valve earlier than the intake valve when the speed of the downward movement of the piston is relatively high; and, an intake and exhaust system for effecting cross-scavenging and air charging due to exhaust gas pulsation between cylinders during at least a heavy load running condition of the engine.

In a two-cycle engine according to this invention, especially in a heavy load condition, cross-scavenging and air charging effects due to exhaust pulsation can be advantageously attained as follows.

The exhaust valve is opened when the pressure in the combustion chamber is high and the speed of the downward movement of the piston is high, so that a large amount of exhaust gas rapidly flows to the exhaust port to obtain a strong blow down. After a substantial amount of exhaust gas is discharged, and at a time when the exhaust port is temporarily at a vacuum, the intake valve is opened to introduce fresh air into the combustion chamber to obtain a cross-scavenging effect. A part of the fresh air is temporarily accumulated in the exhaust port. Then, the exhaust port of this cylinder is subjected to a strong positive pressure due to an exhaust blow down in a exhaust system of the other cylinder, so that the fresh air once accumulated in the exhaust port now flows back to the combustion chamber. Thus, while flowing back to the combustion chamber, the fresh air provides a dynamic pressure at the intake port. However, the flow back of the fresh air is prevented by the one-way valve, so that the dynamic pressure no longer has an affect on the air charging means. Therefore, it is possible to minimize a drive loss of the air charging means and to increase the amount of fresh air introduced into the combustion chamber, to improve the output power of the engine, especially in a heavy load running condition.

DESCRIPTION OF THE PREFERRED EMBODIMENTS

Figure 1:
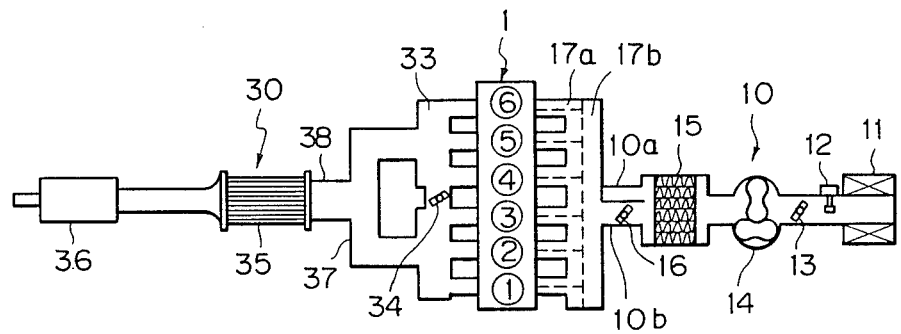
FIG. 1 is a schematic view of a six-cylinder two-cycle internal combustion engine according to the present invention.
Figure 2:
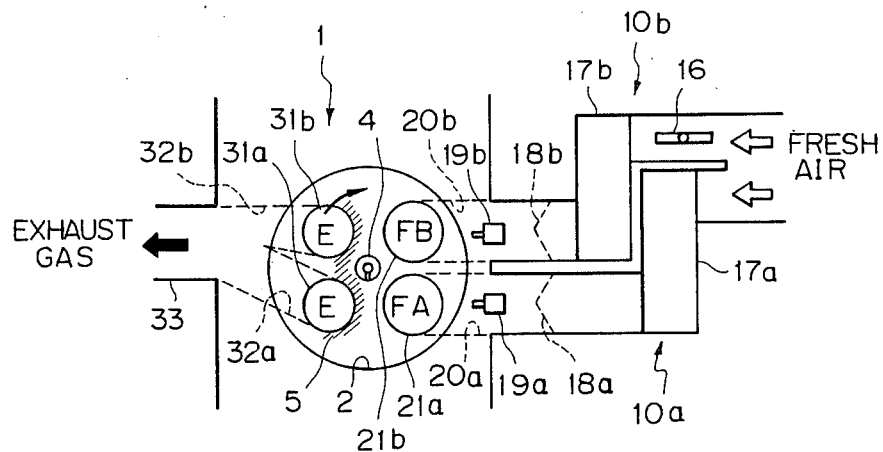
FIG. 2 is a schematic view illustrating a main part of the two-cycle engine shown in FIG. 1.
Figure 3:
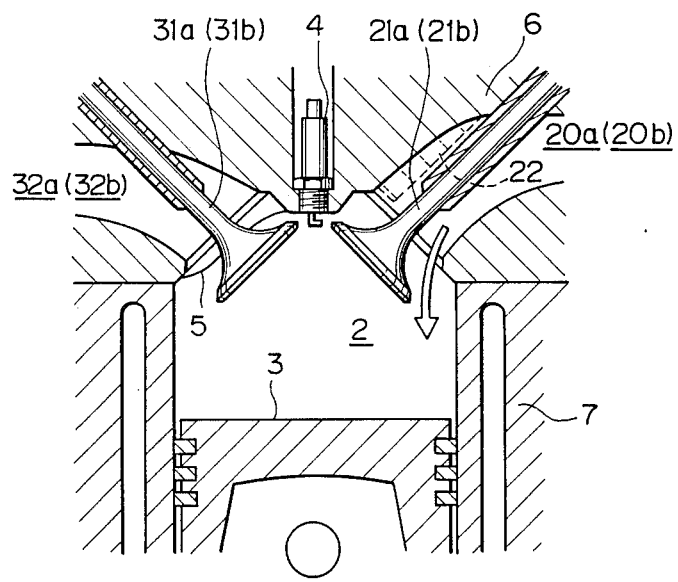
FIG. 3 is a cross-sectional view illustrating a main part of the two-cycle engine shown in FIG. 1.

Referring now to FIGS. 1, 2, and 3, reference numeral 1 denotes an engine body; 10, an air intake system; and 30, an exhaust system. In the engine body 1, reference numeral 2 denotes a combustion chamber (cylinder); 3, a piston; 4, an ignition spark plug; 5, maskings; 6, a cylinder head, and 7, a cylinder block. In the intake system 10, reference numeral 11 denotes an air cleaner; 12, an air flow meter; 13, a throttle valve; 14, a mechanical supercharger; 15, an intercooler; 16, an inlet air control valve; 17a and 17b, surge tanks; 18a and 18b, reed valves (one-way valves); 19a and 19b, fuel injectors; 20a and 20b, intake ports; and 21a and 21b, intake valves. In the exhaust system 30, reference numerals 31a and 31b denote exhaust valves; 32a and 32b, exhaust ports; 33, an exhaust manifold; 34, an exhaust control valve; 35, a catalyzer; and 36, a muffler.

The inlet air flows through the air cleaner 11 and is regulated by the throttle valve 13. The air flow meter 12 is provided between the air cleaner 11 and the throttle valve 13 and meters the flow of inlet air. Located downstream of the throttle valve 13 is a mechanical supercharger 14, which compresses the inlet air. The inlet air heated by the supercharger 14 is then cooled by the intercooler 15 disposed downstream thereof, to increase the volumetric efficiency of the inlet air. The mechanical supercharger 14 may be, for example, a Roots pump type supercharger including a housing in which a pumping operation is carried out to compress the inlet air.

Downstream of the intercooler 15, the intake system 10 is divided into two inlet passages, i.e., an inlet passage 10a for a light load and another inlet passage 10b for a heavy load. The passage 10b is provided with the inlet air control valve 16, which may be a general butterfly valve closed during the idling or light load engine condition and opened during a heavy load (including a middle load) condition. The inlet passages 10a and 10b are connected to the surge tanks 17a and 17b, respectively. The downstream sides thereof are divided by manifolds and led to the respective cylinders and connected to the respective combustion chambers via the intake ports 20a and 20b formed in the cylinder head 6. These intake ports 20a and 20b are directly opened to the combustion chamber 2 from the cylinder head 6. Fuel injectors 19a and 19b are provided in the intake ports 20a and 20b, respectively, in each cylinder. The one-way valves 18a and 18b comprising reed valves are provided upstream of the fuel injectors 19a and 19b and downstream of the surge tanks 17a and 17b, respectively. These one-way valves 18a and 18b are arranged such that inlet air in the intake ports 20a and 20b is prevented from flowing back toward the surge tanks 17a and 17b, respectively.

One of the fuel injectors 19a injects fuel toward the region of a spark plug 4 in any engine condition, and the other fuel injector 19b injects fuel toward the center of the combustion chamber 2 during a heavy load condition wherein the inlet air control valve 16 is opened. Therefore, the fuel injector 19b has a large-sized injection nozzle and injects more fuel than the fuel injector 19a. The inlet air mixed with injected fuel flows into the combustion chamber 2 via the intake ports 20a and 20b provided with the poppet type intake valves 21a and 21b, respectively. These intake valves 21a and 21b are opened or closed in a timing synchronized with the crank angle, as will be mentioned later.

Figure 4:
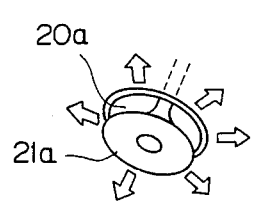
FIGS. 4 and 5 are schematic views illustrating fresh air flowing into a combustion chamber through two intake valves, respectively.
Figure 5:
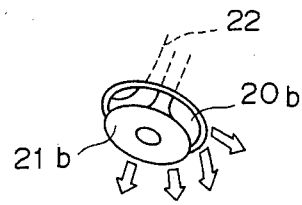

The air/fuel mixture flows from the intake ports 20a and 20b to the combustion chamber 2, as shown in FIGS. 4 and 5. That is, the air/fuel mixture flows from the intake port 20a along substantially the whole periphery of the bevel face of the intake valve 20a, as shown in FIG. 4. On the other hand, as shown in FIG. 5, the air/fuel mixture flows from the intake port 20b along a part of the periphery of the bevel face of the intake valve 20b, i.e., a region of the cylinder wall, and straight downward along the cylinder wall. To this end, a masking wall 22, for example, as shown by a dotted-line in FIGS. 3 and 5, is formed on the inner wall of the intake port 20b in the vicinity of the intake valve 21b and near to the center of the cylinder. Therefore, a large amount of the air/fuel mixture (fresh air) flows through the intake port 20b at a high speed and along the inclined face of the masking wall 22, so that the air/fuel mixture is directed to the side of cylinder wall and downward to the combustion chamber 2 along the cylinder wall.

Two exhaust ports 32a and 32b are also directly opened to the combustion chamber 2 from the cylinder head 6 at positions opposite to the intake ports 20a and 20b, respectively. These exhaust ports 32a and 32b are also opened or closed by the poppet-type exhaust valves 31a and 31b, respectively, in a timing synchronized with the crank angle, as will be mentioned later. The exhaust ports 32a and 32b are combined and connected to an exhaust manifold 33 at the downward side and in the vicinity of the exhaust valves 31a and 31b. The exhaust manifold 33 is provided with an exhaust control valve 34 which interrupts of connects the flow between the manifold pipes of Nos. 1 to 3 cylinders and the manifold pipes of Nos. 4 to 6 cylinders. Two manifold portions 33a and 33b are connected by a two-way manifold 37, which is connected to an exhaust pipe 38.

In the illustrated six-cylinder two-cycle engine, assuming that the cycle is repeated in the order 1, 6, 2, 4, 3, 5 at each 60° crank angle, the operation cycle is repeated at each 120° crank angle in each cylinder group 1, 2, and 3, or 4, 5 and 6. A catalyzer 35 and a muffler 36 are located downstream of the exhaust pipe 38. The exhaust control valve 34 serves merely to control the exhaust gas pressure and, therefore, a general butterfly valve may be sufficient for that purpose, since strict sealing is not required. However, it is understood that a poppet-type valve or the like having a high sealing effect may be used. The exhaust control valve 34 is controlled in such a manner that it opens in the idling or light load running condition and closes in the high load running condition.

The combustion chamber 2 in each cylinder is defined between the cylinder head 6, the piston 3, and the cylinder block 7 and is provided with an ignition spark plug 4 at the center of the cylinder head 6. Around the exhaust valves 31a and 31b, the cylinder head 6 is provided with masking portions 5, which facilitate the formation of a swirl in the exhaust gas, particularly an appropriate swirl rotating around the axis of the cylinder (combustion chamber 2) when the exhaust gas flows back to the combustion chamber 2 from the exhaust ports 32a and 32b via the bevel faces of the exhaust valves 31a and 31b, especially in the idle or light load running condition. In place of (or in addition to) such masking portions 5, one or both of the exhaust ports 32a and 32b may be an eccentric exhaust port, as shown at 32b in FIG. 2, so that a swirl is formed in the exhaust gas when it flows in the tangential direction back to the combustion chamber 2 from the exhaust port 32b.

Figure 6:
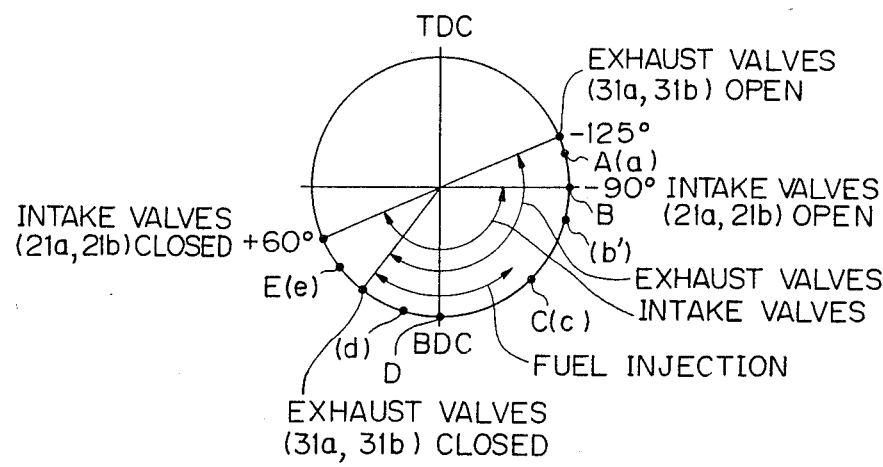
FIG. 6 is a timing chart illustrating the opening and closing of exhaust and intake valves and the injection timing by fuel injectors.

The intake valves 21a and 21b and the exhaust valves 31a and 31b are operated, although not illustrated, by cam members mounted on a cam shaft which is rotated at the same speed as the crank shaft, so that these valves are opened and closed in accordance with predetermined timings, as shown in FIG. 6. That is, the exhaust valves 31a and 31b are first opened at approximately $-125°$ with respect to the bottom dead center (BDC) and then the intake valves 21a and 21b are opened at approximately $-90°$. On the other hand, the exhaust valves 31a and 31b are closed at approximately $+40°$ with respect to the bottom dead center (BDC) and the intake valves 21a and 21b are closed at approximately $+60°$. The fuel injectors 19a and 19b inject fuel approximately between $+45°$ to $-40°$.

Figure 7:
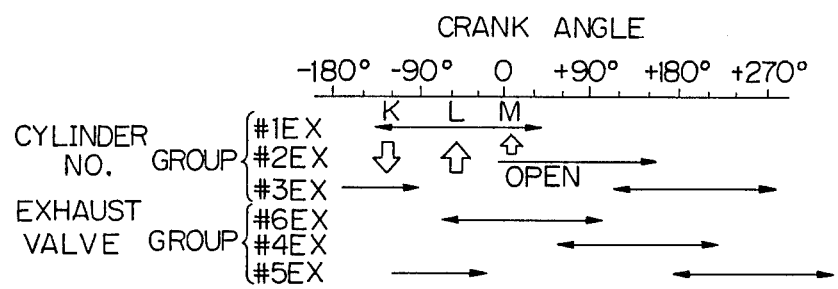
FIG. 7 is an opening and closing timing chart of exhaust valves in a plurality of cylinders.

In the illustrated six-cylinder two-cycle engine, assuming that the operation cycle is repeated in the order 1, 6, 2, 4, 3, 5 at each 60° crank angle, the exhaust valves 31a and 31b of each cylinder are opened and closed as illustrated in FIG. 7. The solid lines in FIG. 7 indicate time periods, with respect to the crank angle of the cylinder No. 1, during which the exhaust valves 31a and 31b in the respective cylinders are opened. On the other hand, the exhaust control valve 34 is controlled in such a manner that it opens at least in the idling or light load running condition, as mentioned above.

Therefore, in the idling or light load running conditions, all the branches of the exhaust manifold 33 are connected to each other. For example, as illustrated in FIG. 7, in the initial period K in the cylinder No. 1 during which the exhaust valves 31a and 31b start to open, the exhaust valves in the cylinder No. 3 are still open. In the intermediate period L, the exhaust valves in cylinder No. 6 start to open, and in the final period M, the exhaust valves in the cylinder No. 2 start to open. In particular, due to the exhaust pressure from the other cylinder group (i.e., cylinder No. 6), the exhaust ports 32a and 32b are always subjected to a substantial positive pressure and, therefore, the effects of the exhaust pulsation charge in each cylinder are not generated. In the other cylinders, the same operation is performed so that the exhaust pressure in each cylinder cooperatively interferes with the other pressure and controls the back pressure, as mentioned later.

On the other hand, in the middle or heavy load running condition of the engine, the exhaust control valve 34 is closed so that the exhaust pressure is subjected only slightly to the back pressure from the cylinder No. 6. therefore, the exhaust ports 32a and 32b in the cylinder No. 1 are subjected to pressure interference (M) from the cylinder No. 2 and, therefore, the effects of the exhaust pulsation charge are generated. To avoid the pulsation pressure which would be generated just after a blowdown in a low speed running condition, a resonance chamber (not shown) may be connected to the exhaust port.

The operation of a six-cylinder two-cycle engine according to this invention will now be described with reference to FIGS. 6 through 9.

First, in the idling or light load running condition of the engine, the inlet air control valve 16 is closed and the exhaust control valve 34 is opened. During the downward movement of the piston 3, the exhaust valves 31a and 31b start to open when the piston 3 arrives at a point approximately $-125°$ from the top dead center (BDC) in FIG. 6. Therefore, at a region (A) in FIG. 6, exhaust gas flows out through the exhaust valves 31a and 31b which are just opened (weak blowdown P in FIG. 8). This blowdown (P) is quickly completed, since in the idling or light load condition, the pressure in the combustion chamber 2 is low and the amount of exhaust gas is small. That is, in the exhaust ports 32a and 32b, although the exhaust gas pressure temporarily rises to 2 to 3 kg/cm$^2$, it is immediately reduced to and balanced at about 1.05 kg/cm$^2$. When the engine is running at a high speed, the exhaust gas pressure is more stably balanced.

Then, at a point (B), i.e., crank angle $-90°$ in FIG. 6, the speed of the downward movement of the piston 3 is relatively high. Therefore, the cylinder pressure becomes a vacuum and is influenced by the exhaust gas pressure of the other cylinder group (i.e., cylinder No. 6), as shown at L in FIG. 7. Therefore, high temperature exhaust gas which has been once "blowndown" to the exhaust ports 32a and 32b flows back to the combustion chamber 2, as shown at Q in FIG. 8. An exhaust gas swirl (R) is formed around the axis of the cylinder chamber 2 by a swirl forming means, i.e., the eccentric port 32b and the maskings 5. This swirl is relatively slow and serves to prevent an escape of the exhaust gas heat in the combustion chamber 2.

Fresh air does not flow in at the point just after the intake valves 21a and 21b are opened, since the pressure in the intake port 20a is controlled by the throttle valve 13 and the lift of the intake valve 21a is so small that the port is further throttled. Therefore, the flow back of the exhaust gas from the exhaust ports 32a and 32b proceeds further. When the piston 3 moves further downward and the speed thereof becomes slow, the lift of the intake valves is increased, as shown at C in FIGS. 6 and 8, and the fresh air (mixture), which has been controlled by the throttle valve 13 and compressed at a low pressure by the supercharger 14, flows into the combustion chamber 2 via the intake valve 21a in the intake port 20a. A flow back of the fresh air is prevented by the one-way valves 18a and 18b, even though the pressure in the combustion chamber 2 is still high just after the intake valves 21a and 21b are opened.

In this case, as mentioned above, the fresh air flows from the intake port 20a along substantially the whole periphery of the bevel face of the intake port 20a, as shown in FIG. 4. In this running condition, the speed of the downward movement of the piston 3 is relatively slow, the pressure reduction in the cylinder is small and, therefore, the velocity of the fresh air is low. Therefore, the fresh air flows slowly onto the exhaust swirl (R) in the combustion chamber 2 and is collected at the upper portion thereof, i.e., around the spark plug 4 opposite to the cylinder head 6. Thus, a suitable stratification consisting of a fresh air region (S) at the cylinder head (upper) side and an exhaust gas region (R) at the piston (lower) side is obtained in the combustion chamber 2. As the exhaust gas (R) swirls around the cylinder axis, this stratification of the fresh air (S) and exhaust gas (R) is maintained until the piston 3 arrives at the bottom dead center (BDC), as shown at D in FIGS. 6 and 8.

Figure 8:
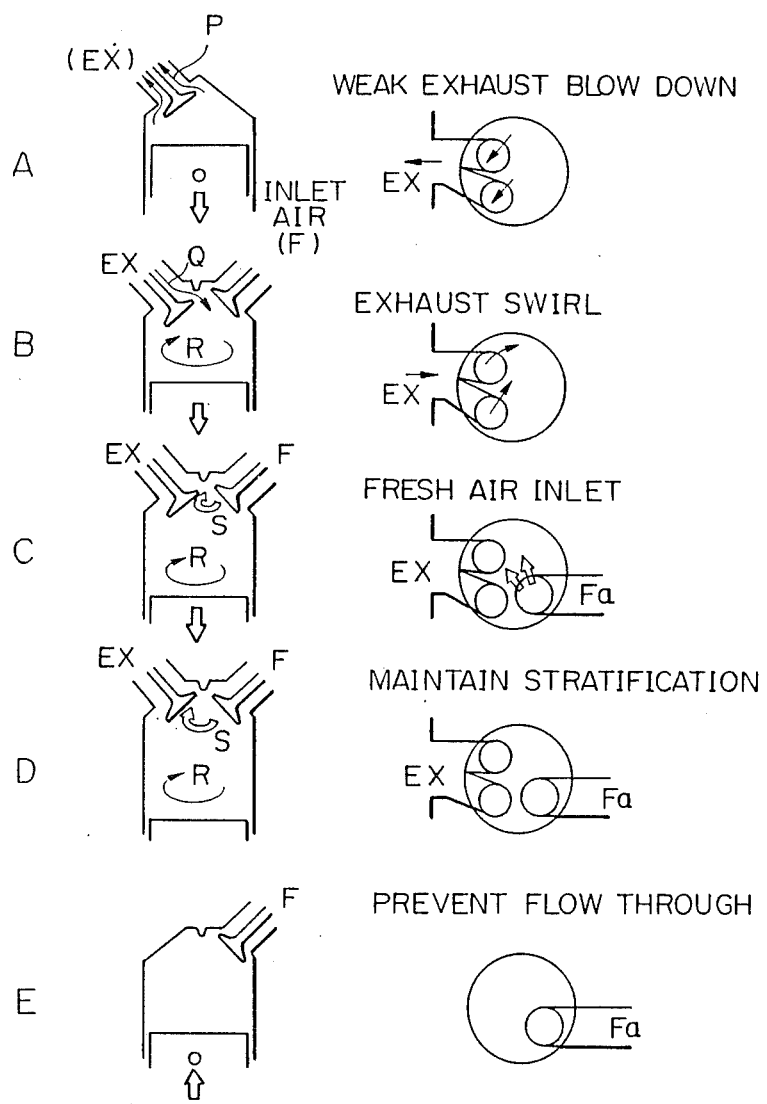
FIG. 8 is a view for explaining, in series, the changes of exhaust gas and fresh air in an idling or light load running condition of the engine.
Figure 9:
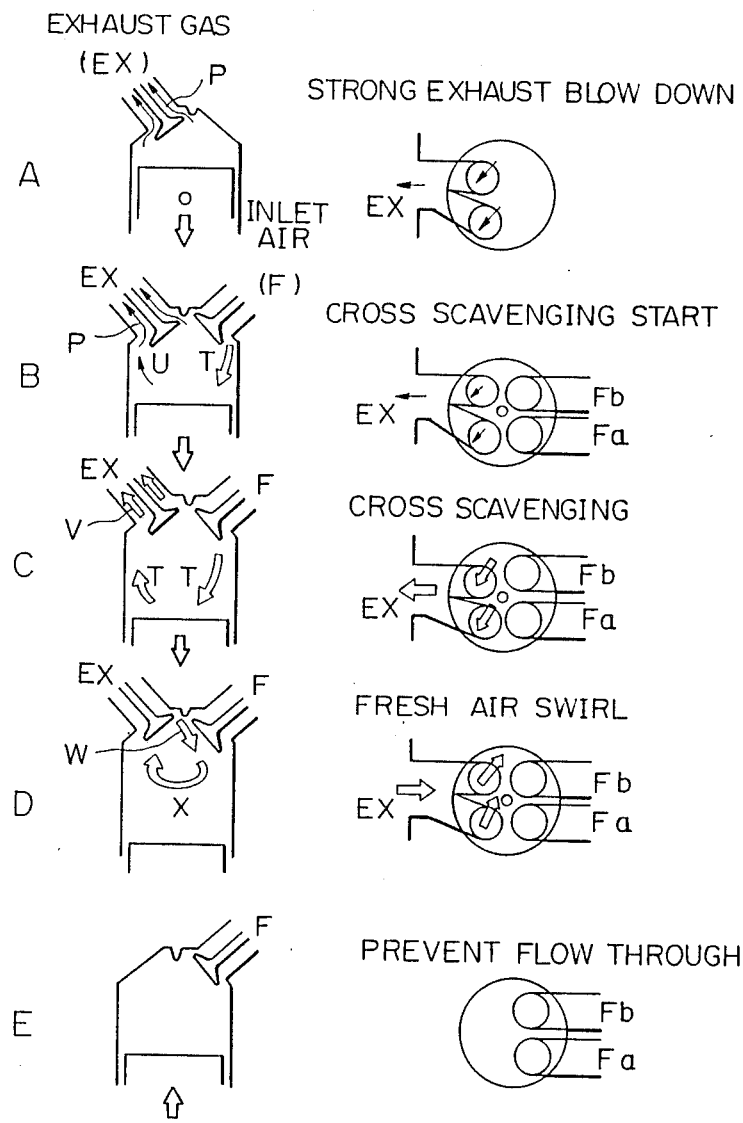
FIG. 9 is a view for explaining, in series, the changes of exhaust gas and fresh air in a heavy load condition.

Even after the intake valve 21a is closed and the fresh air intake is substantially ended, as shown at E in FIGS. 6 and 8, the stratification of the fresh air (S) and exhaust gas (R) is still maintained. As this stratification is also maintained until the end of the pressurizing stroke, the fresh air in the vicinity of the cylinder head 6 is heated and activated by the high temperature exhaust gas region near the piston 3. Therefore, if this engine is in the idling condition, the mixture is readily burnt by the spark plug 4 at the end of the pressurizing stroke and the flame spreads so that a stable combustion can be attained. If the engine is in the light load running condition after the engine is warmed up, the temperature of the exhaust gas in the cylinder chamber is high and activation of the fresh air is promoted, so that it is possible for the fresh air to self-ignite without ignition by the spark plug 4, due to the adiabatic compression during the pressurizing stroke.

At points D and E, as illustrated at L and M in FIG. 7, the pressure in the exhaust ports 32a and 32b is always positive in the idling or light load running condition due to the exhaust gas (back) pressure from the other cylinders exerted thereon. Therefore, there is substantially no charging effect due to exhaust pulsation, so that the fresh air is prevented from flowing out to the exhaust system and the swirl flow (R) is not disturbed. Therefore, a stable stratification combustion can be attained.

In the heavy load running condition of the engine, the intake air control valve 16 is opened and the exhaust control valve 34 is closed. During the downward movement of the piston 3, the exhaust valves 31a and 31b start to open at the point (a) in FIG. 6, as shown in FIG. 9A. The exhaust gas flows out abruptly (blowdown P) through the exhaust valves 31a and 31b which are just opened. The amount of exhaust gas in the heavy load condition is so large that the blowdown (P) is strong and continues for a relatively long time. The blowdown (P) is completed at a crank angle of −90°. Therefore, a large amount of exhaust gas is discharged. At a point (b) in FIG. 6, i.e., at a crank angle of −80°, the intake valves 21a and 21b are substantially opened to introduce the fresh air (T), as shown in FIG. 9B. Therefore, the compressed fresh air (air/fuel mixture) starts to flow into the combustion chamber 2 through the intake ports 20a and 20b via the intake valves 21a and 21b. A flow back of the fresh air is also prevented by the one-way valves 18a and 18b, even though the pressure in the combustion chamber is still high just after the intake valves 21a and 21b are opened. At this stage, the exhaust gas (U) is still continuously discharged.

In the heavy load condition, as the inlet air control valve 16 is opened as mentioned above, the fresh air flows through both the intake ports 20a and 20b. Especially, a large amount of fresh air flows rapidly through the intake port 21b into the combustion chamber 2 directly downward along the cylinder wall, as shown in FIG. 5. Therefore, as shown in FIG. 9B, a so-called cross-scavenging starts between the exhaust gas (U) and the fresh air (T). Then, as shown in FIG. 6(b) and (c) and FIGS. 9B and 9C (during a crank angle of from −80° to −50°), the pressure in the exhaust ports 32a and 32b becomes temporarily a vacuum due to the charging effects of exhaust gas pulsation caused by the strong blowdown. Therefore, the introduction of fresh air is further promoted and a part of the fresh air (V) is temporarily accumulated in the exhaust ports 32a and 32b and the exhaust manifold 33.

Then, at a point (d) in FIG. 6(b) and FIG. 9D, a strong positive pressure as shown at M in FIG. 7 is exerted due to a strong blowdown of the other cylinder (the second cylinder) in which the exhaust valves thereof are just opened, so that the fresh air (V) which has been temporarily accumulated in the exhaust ports 32a and 32b and the exhaust manifold 33 now flows back to the combustion chamber 2. While the fresh air flows back through the eccentric exhaust port 32b and masking 5 into the combustion chamber 2, it forms a strong swirl (X). Although a dynamic pressure is exerted on the intake ports 20a and 20b by the fresh air flowing back into the combustion chamber 2, the dynamic pressure is no longer transmitted to the upstream region because the presence of the one-way valves 18a and 18b. After the intake valves 21a and 21b are closed, as shown at (e) in FIG. 6 and FIG. 9E, the fresh air no longer flows through the exhaust ports 32a and 32b.

Figure 10:
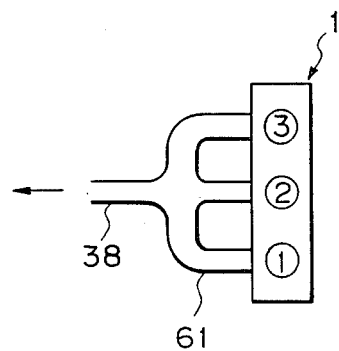
FIG. 10 is a schematic view of an exhaust gas control system in a three-cylinder two-cycle engine; and, FIG. 11 is an opening and closing timing chart of exhaust valves in the three-cylinder engine shown in FIG. 10.
Figure 11:
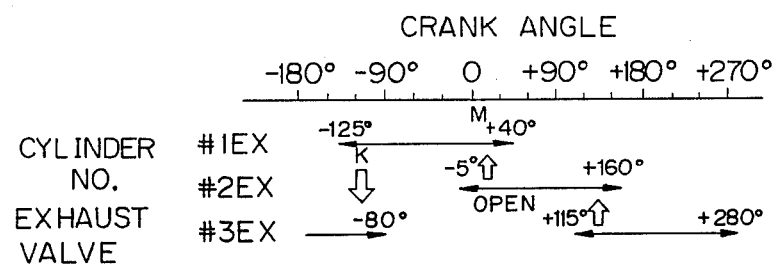

Although the above mentioned two-cycle engine has six-cylinders, a two-cycle engine according to the present invention may have three, or a multiple of three cylinders. In a three-cylinder engine, as shown in FIG. 10, exhaust pipes 61 of the respective cylinders are connected to a single exhaust pipe 38. Therefore, according to this embodiment, in the heavy load condition, each exhaust pipe 61 is subjected to a blowdown M of back pressure in the other cylinder having a cycle delayed by 120°, as shown in FIG. 11 and, therefore, exhaust pulsation charging effects also can be expected, in the same manner as mentioned above.

In the above embodiment, as shown in FIG. 6, the two intake valves 21a and 21b are opened at the same time. However, the intake valve 21b may be opened a little earlier than the intake valve 21a, in order to make an early introduction of a large amount of fresh air into the combustion chamber 2 in the heavy load condition. In this case, only one 18b of the one-way valves may be provided in the heavy load intake port 20b, since no substantial dynamic pressure due to the flow back from the combustion chamber 2 is exerted on the intake port 20a.

A two-cycle engine according to the present invention also may be constituted as a diesel engine. In this case, a stratification can be also obtained between the fresh air before fuel injection and the exhaust gas. After the fresh air is sufficiently heated by the exhaust gas, fuel is injected directly into the combustion chamber and, therefore, it is possible that the fresh air will self-ignite without ignition by a spark plug even at a relatively low compression ratio.

We claim:

1. A two-cycle internal combustion engine having three, or a multiple of three, cylinders comprising: a cylinder head having, for each cylinder, at least one intake port for introducing fresh air into a combustion chamber and at least one exhaust port for discharging exhaust gas; an air charging means for supplying compressed fresh air to said intake port; intake and exhaust valves for opening and closing said intake and exhaust ports, respectively; and a valve operating means operated in response to a crank angle; characterized in that said engine further comprises:

a one-way valve provided between said intake valve and said air charging means, in said intake port in each cylinder, so that air or gas is prevented from flowing back toward said air charging means;

said valve operating means including a means for opening said exhaust valve earlier than said intake valve when a speed of downward movement of the piston is relatively high; and, an intake and exhaust system for effecting cross-scavenging and air charging due to exhaust gas pulsation between cylinders during at least a high load running condition of the engine.

2. A two-cycle engine as set forth in claim 1, wherein said air charging means for supplying compressed fresh air to the intake port is a supercharger.

3. A two-cycle internal combustion engine having three, or a multiple of three, cylinders comprising: a cylinder head having, for each cylinder, first and second intake ports for introducing fresh air into a combustion chamber and at least one exhaust port for discharging exhaust gas; an air charging means for supplying compressed fresh air to said first and second intake ports; first and second intake valves for opening and closing said first and second intake ports, respectively; an exhaust valve for opening and closing said exhaust port; and a valve operating means operated in response to a crank angle; characterized in that said engine further comprises:

first and second one-way valves provided in said first and second intake ports, respectively, and between the respective intake valves and said air charging means, so that air or gas is prevented from flowing back toward said air charging means;

an inlet air control valve provided in said first intake port, between said one-way valve and said air charging means, said air control valve being closed in an idling and light load condition;

said valve operating means including a means for opening said exhaust valve earlier than said first and second intake valves when the speed of the downward movement of the piston is relatively high; and, an intake and exhaust system for effecting cross-scavenging and air charging due to exhaust gas pulsation between cylinders during at least a heavy load running condition of the engine.

4. A two-cycle engine as set forth in claim 3, wherein said air charging means for supplying compressed fresh air to the intake ports comprises a supercharger provided in an air inlet passage which is divided, at the downstream side thereof, into said first and second intake ports.

* * * * *